(12) United States Patent
Weistrand

(10) Patent No.: US 10,467,761 B2
(45) Date of Patent: Nov. 5, 2019

(54) SYSTEM AND METHOD FOR HANDLING IMAGE DATA

(71) Applicant: RaySearch Laboratories AB, Stockholm (SE)

(72) Inventor: Ola Weistrand, Huddinge (SE)

(73) Assignee: RaySearch Laboratories AB, Stockholm (SE)

( * ) Notice: Subject to any disclaimer, the term of this patent is extended or adjusted under 35 U.S.C. 154(b) by 41 days.

(21) Appl. No.: 15/738,891

(22) PCT Filed: Jun. 23, 2016

(86) PCT No.: PCT/EP2016/064516
§ 371 (c)(1),
(2) Date: Dec. 21, 2017

(87) PCT Pub. No.: WO2016/207271
PCT Pub. Date: Dec. 29, 2016

(65) Prior Publication Data
US 2018/0182106 A1    Jun. 28, 2018

(30) Foreign Application Priority Data
Jun. 24, 2015 (EP) ...................................... 5173679

(51) Int. Cl.
*G06K 9/00* (2006.01)
*G06T 7/174* (2017.01)
(Continued)

(52) U.S. Cl.
CPC ............ *G06T 7/174* (2017.01); *G06T 3/0081* (2013.01); *G06T 7/0012* (2013.01); *G06T 7/12* (2017.01);
(Continued)

(58) Field of Classification Search
CPC ......... G06T 7/174; G06T 7/12; G06T 7/0012; G06T 7/136; G06T 7/149; G06T 7/155;
(Continued)

(56) References Cited

U.S. PATENT DOCUMENTS

| 8,666,128 B2 * | 3/2014 | Chaney | .................. G06K 9/621 382/128 |
| 10,178,955 B2 * | 1/2019 | Rucker | ................ A61B 5/0033 |

(Continued)

FOREIGN PATENT DOCUMENTS

| WO | WO-2012/069965 A1 | 5/2012 |
| WO | WO-2013/155358 A1 | 10/2013 |

OTHER PUBLICATIONS

Liu, Fan, et al., "Automatic liver contour segmentation using GVF snake," Proceedings of SPIE, vol. 5370, May 12, 2004, pp. 1466-1473.

(Continued)

*Primary Examiner* — Jose L Couso
(74) *Attorney, Agent, or Firm* — Drinker Biddle & Reath LLP

(57) ABSTRACT

A data processing unit receives a reference image ($IMG1_{3D}$) of a deformable physical entity, a target image ($IMG2_{3D}$) of said physical entity, and a first region of interest ($ROI1_{3D}$) defining a first volume in the reference image ($IMG1_{3D}$) representing a reference image element. The reference image ($IMG1_{3D}$), the target image ($IMG2_{3D}$) and the first region of interest ($ROI1_{3D}$) all contain 3D datasets. In response to user commands (c1; c2), the data processing unit defines a first contour ($C1_{2D}$) in a first plane through the target image ($IMG2_{3D}$), which is presented to a user via a display unit together with graphic data reflecting the reference image ($IMG1_{3D}$), the target image ($IMG2_{3D}$) and the first region of interest ($ROI1_{3D}$). The first contour ($C1_{2D}$) is aligned with at least a portion of a first border (IEB1) of a (Continued)

target image element ($IE_{3D}$) in the target image ($IMG2_{3D}$). The target image element ($IE_{3D}$) corresponds to the reference image element in the reference image ($IMG1_{3D}$). Based on the first contour ($C1_{2D}$), the target image ($IMG2_{3D}$) and the first region of interest ($ROI1_{3D}$); the data processing unit determines a second region of interest ($ROI2_{3D}$) defining a second volume in the target image ($IMG2_{3D}$).

15 Claims, 3 Drawing Sheets

(51) Int. Cl.
  *G06T 7/12* (2017.01)
  *G06T 3/00* (2006.01)
  *G06T 7/00* (2017.01)
  *G06T 15/08* (2011.01)

(52) U.S. Cl.
  CPC .......... *G06T 15/08* (2013.01); *G06T 2200/04* (2013.01); *G06T 2207/10072* (2013.01); *G06T 2207/20041* (2013.01); *G06T 2207/20096* (2013.01); *G06T 2207/20104* (2013.01); *G06T 2207/30056* (2013.01)

(58) Field of Classification Search
  CPC ..... G06T 7/0083; G06T 7/0097; G06T 7/564; G06T 7/11; G06T 7/187; G06T 7/344; G06T 7/022; G06T 7/008; G06T 7/30; G06T 7/33; G06T 3/0081; G06T 15/00; G06T 15/08; G06T 19/00; G06T 19/003; G06T 19/20; G06T 2200/04; G06T 2207/10072; G06T 2207/20041; G06T 2207/20096; G06T 2207/20104; G06T 2207/10081; G06T 2207/20116; G06T 2207/10076; G06T 2207/10088; G06T 2207/10132; G06T 2207/10136; G06T 2207/20108; G06T 2207/10028; G06T 2207/20016; G06T 2207/20101; G06T 2207/20192; G06T 2207/30004–30096; A61B 5/00; A61B 5/0033; A61B 6/583; A61B 8/13; A61B 8/483; A61B 90/36; A61B 2017/00694; A61B 2090/364; G01S 15/8993; G01S 15/899; G01S 7/52074; G06F 19/321; Y10S 128/916; Y10S 128/92; Y10S 706/924; Y10S 707/957; G06K 9/46; G06K 9/4604; G06K 9/6204; G06K 9/6207; G06K 9/6232; G06K 9/6251; G06K 9/00765; G06K 9/34; G06K 9/6289; G06K 9/00201; G06K 9/00208; G06K 9/00214; G06K 2009/2045; G06K 2209/05
  See application file for complete search history.

(56) References Cited

U.S. PATENT DOCUMENTS

| | | | |
|---|---|---|---|
| 2008/0008369 A1* | 1/2008 | Koptenko | G06K 9/4604 382/128 |
| 2008/0123927 A1* | 5/2008 | Miga | G06T 7/344 382/131 |
| 2011/0268330 A1* | 11/2011 | Piper | G06K 9/6207 382/131 |
| 2012/0105430 A1* | 5/2012 | Waschbuesch | G06T 7/0016 345/419 |
| 2012/0330635 A1* | 12/2012 | Miga | G06T 7/33 703/11 |
| 2013/0034278 A1* | 2/2013 | Gindele | G06T 7/11 382/128 |
| 2014/0037161 A1* | 2/2014 | Rucker | A61B 5/0033 382/128 |
| 2015/0104091 A1* | 4/2015 | Miyasa | G06T 7/344 382/131 |
| 2016/0307292 A1* | 10/2016 | Endo | A61B 6/4417 |
| 2019/0012066 A1* | 1/2019 | Ahonen | A61N 5/1031 |

OTHER PUBLICATIONS

Zhang, Ye, et al., "Respiratory liver motion estimation and its effect on scanned proton beam therapy," Physics in Medicine and Biology, IOP Publishing, vol. 57, No. 7, Mar. 9, 2012, pp. 1779-1795.

Xiao Han et al., "A Morphing Active Surface Model for Automatic Re-contouring in 4D Radiotherapy," Proceedings of Spie (Mar. 1, 2007) vol. 6512, pp. 65123H-65123H-9.

* cited by examiner

SYSTEM AND METHOD FOR HANDLING IMAGE DATA

This application is the National Stage of International Application No. PCT/EP2016/064516, filed Jun. 23, 2016, and claims benefit of European Patent Application No. 15173679.0, filed Jun. 24, 2015, the entire contents of which are incorporated by reference herein.

THE BACKGROUND OF THE INVENTION AND PRIOR ART

The present invention relates generally to processing of three-dimensional, 3D, images. More particularly the invention relates to an image handling system according to the preamble of claim 1 and a corresponding method. The invention also relates to a computer program product and a processor-readable medium.

In some types of 3D imaging, especially in the medical field, it is important that one can identify one or more particular items in both a first image, a second image and any subsequent images of an object/subject. For example, a patient's liver may be defined in a first computer tomography, CT, image registered prior to performing a radiation therapy session. Then, a physician is interested in examining the effects of the therapy. To this aim, it is important that the liver can be adequately identified in a second image registered after the therapy session. In the second image, the liver may have a different shape than in the first image. Presuming that tumorous tissue to be treated is located in the liver, the irradiation, as such, will probably have deformed the organ somewhat. However, the mere fact that the gastric contents is different, the patient has a slightly different position and/or that different imaging equipment was used when registering the second image may also explain why a deformation has occurred. In any case, it is normally a far from trivial task to identify the volume boundaries of an organ, e.g. a liver, in a second image on the basis of an identification made in a corresponding first image. Since the data set is in 3D, the identification of an organ or structure is often a manual process, wherein an operator has to define the relevant boundary in a respective image plane—segment per segment through the entire volume of interest.

WO 2012/069965 describes a radiation therapy planning system including a planning module, which receives a first planning image set from a diagnostic imaging apparatus and uses automatic segmentation tools or manual segmentation tools and a radiation therapy planning system to generate a first radiation therapy plan. After the first radiation therapy plan has been applied for one or more therapy sessions, a second planning image set is generated. The planning module uses a deformable image registration algorithm to register the planning image set and generate a corresponding deformation map which is applied to segmented objects of interest, OOIs, of the segmented first planning image set to propagate the objects of interest onto the second planning image set. The deformation map is corrected in accordance with deviations between the propagated and actual OOI locations in two steps: 1) manual and/or automated corrections of the propagated OOIs are performed, such as region of interest contour corrections and/or landmark point of interest positions; 2) a corrected global deformation map is generated from these local OOI corrections. The corrected deformation map is applied to the first radiation therapy plan and an accumulated radiation map depicting the radiation accumulated in each OOI during the therapy session(s) implemented with the first radiation therapy plan.

Problems Associated with the Prior Art

Although the above-described solution may provide an end result of high-quality, the applied strategy is relatively inefficient and time consuming because a complete 3D volume must be defined manually in order to obtain the deformation map, i.e. the vector field that describes the transform of the OOI from the first image to the second image.

SUMMARY OF THE INVENTION

The object of the present invention is therefore to ameliorate the above problem, and thus offer an improved image handling solution.

According to one aspect of the invention, the object is achieved by the image handling system described initially, wherein the data processing unit is further configured to define, in response to the user commands, a first contour in a first plane through the target image. We here presume that such user commands are entered so that the first contour is aligned with at least a portion of a border of a target image element in the target image. Moreover, we also presume that the target image element corresponds to the reference image element in the reference image. Additionally, the data processing unit is further configured to determine a second region of interest defining a second volume in the target image. The second region of interest is determined by the data processing unit based on the first contour, the target image and the first region of interest.

This image handling system is advantageous because it does not require a complete manual registration in 3D of the region of interest in the target image. In fact, in many cases, it is sufficient if the user defines the first contour along a portion of the border of the target image element in the first plane only.

According to one preferred embodiment of this aspect of the invention, the data processing unit is further configured to compute a vector field describing a relationship between the first and second regions of interest. The vector field has such properties that the second region of interest is obtainable by transforming the first region of interest via the vector field. This is advantageous because it allows convenient double-checking that an adequate relationship has been found. Namely, if one takes the first region of interest and transforms it via the vector field, a resulting second region matching the second volume in the target image shall be obtained. Thus, an operator may visually investigate the data quality by comparing a transformed version of the first region of interest with the image data of the target image.

Consequently, according to another preferred embodiment of this aspect of the invention, the data processing unit is further configured to generate the second region of interest based on the first region of interest and the vector field. The data processing unit is also configured to produce graphic data for presentation on the display unit, which graphic data reflect the second region of interest overlaid on the target image. By this means, it is rendered straightforward to corroborate the quality of the vector field, and thereby also the data quality associated with the second region of interest.

According to yet another preferred embodiment of this aspect of the invention, the data processing unit is further configured to receive additional user commands, and in response thereto, define a second contour in a second plane through the target image. Analogous to the above, we also presume that the second contour is aligned with at least a portion of a border of the target image element in the target image. Then, on the further basis of the second contour, the data processing unit is configured to determine the second region of interest. Hence, the user can adjust any shortcomings of the original vector field in a very intuitive manner.

According to still another preferred embodiment of this aspect of the invention, the data processing unit is configured to determine the second region of interest based on a non-linear optimization algorithm applied to the first contour and an intersection between the second region of interest and the first plane. The non-linear optimization algorithm is configured to penalize deviation of the second region of interest from the first contour. Thereby, the second region of interest can be generated efficiently and with high accuracy.

According to a further preferred embodiment of this aspect of the invention, we assume that the second region of interest is represented by a triangular mesh. Here, the non-linear optimization algorithm involves computing a set of intersection points between the second region of interest and the first plane, where each intersection point in the set of intersection points is computed by means of a convex combination of eight voxel centers located adjacent to the intersection point using mean value coordinates. The non-linear optimization algorithm involves applying a two-dimensional distance transform on a Euclidean distance between each computed intersection point and the first contour. Hence, the algorithm takes 3D aspects of the user-defined contour in the first plane into account. This may further enhance the efficiency and accuracy of the proposed system.

According to another preferred embodiment of this aspect of the invention, we again assume that the second region of interest is represented by a triangular mesh; and the non-linear optimization algorithm involves computing a set of intersection points between the second region of interest and the first plane. Here, however, for each intersection point in the set of intersection points, a normal projection is determined from the second region of interest towards the first plane. The normal projection extends in an interval of predetermined length. If, within the predetermined length, the normal intersects with the first contour at a juncture, the juncture in question is included as a tentative delimitation point of an updated second region of interest. The determining step is then repeated based on the updated second region of interest until a stop criterion is fulfilled. Consequently, the algorithm also takes 3D aspects of the user-defined contour in the first plane into account, however in a different manner than in the above-described embodiment of the invention.

According to another aspect of the invention, the object is achieved by the method described initially, wherein the method involves defining, in response to the user commands, a first contour in a first plane through the target image. Here, we presume that such user commands are entered so that the first contour is aligned with at least a portion of a border of a target image element in the target image. The target image element corresponds to the reference image element in the reference image. The method further involves determining a second region of interest defining a second volume in the target image. The second region of interest is determined based on the first contour, the target image and the first region of interest. The advantages of this method, as well as the preferred embodiments thereof, are apparent from the discussion above with reference to the proposed system.

According to a further aspect of the invention, the object is achieved by a computer program product, which is loadable into the memory of a computer, and includes software for performing the steps of the above proposed method when executed on a computer.

According to another aspect of the invention, the object is achieved by a processor-readable medium, containing instructions which, when executed by at least one processor, cause the at least one processor to perform the proposed method.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED
EMBODIMENTS OF THE INVENTION

Figure 1:
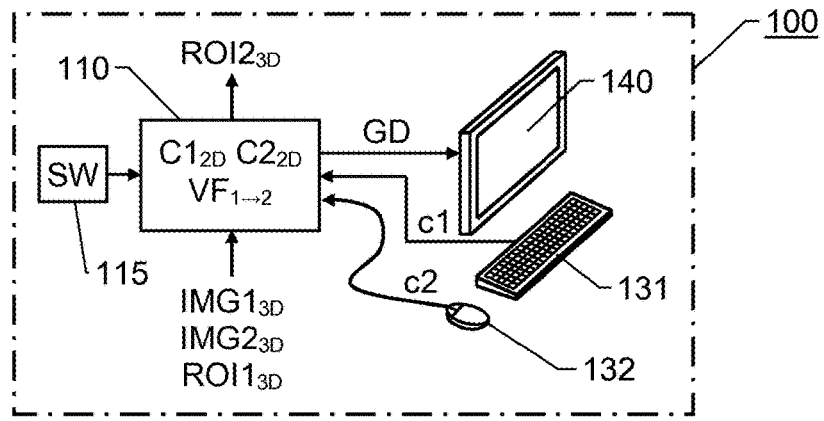
FIG. 1 shows a block diagram over an image handling system according to one embodiment of the invention.
Figure 2:
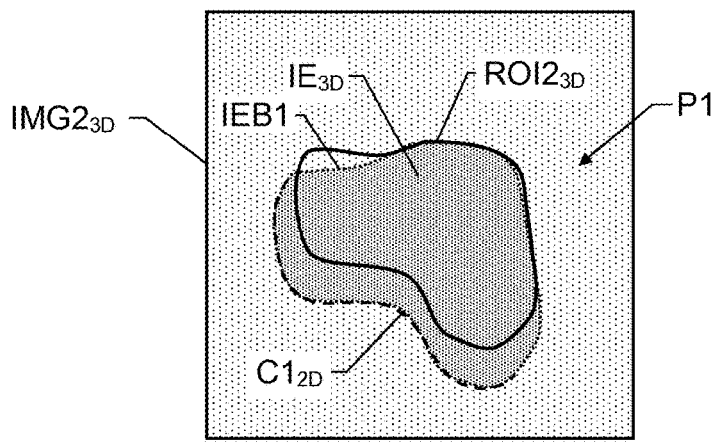
FIG. 2 illustrates a first example of a first contour in a first plane in the target image together with a border of an image element and an example of the first contour.

Initially, we refer to FIGS. 1 and 2, which show a block diagram over an image handling system 100 according to one embodiment of the invention, respective illustrates a first example of a first contour in a first plane in the target image together along with a border of an image element and an example of the first contour.

The proposed image handling system 100 includes a data processing unit 110, at least one data input unit 131 and 132 and a display unit 140.

The data processing unit 110 is configured to receive a reference image $IMG1_{3D}$ of a deformable physical entity, e.g. representing an organ or a body structure of a patient. The reference image $IMG1_{3D}$ is a 3D dataset, typically containing a relatively large number of voxels that may have been registered by an X-ray computer tomograph, a magnetic resonance equipment (e.g. using magnetic resonance imaging, MRI, nuclear magnetic resonance imaging, NMRI, or magnetic resonance tomography, MRT), an ultrasonic camera or a cone beam computed tomography, CBCT, scanner.

The data processing unit 110 is also configured to receive a target image $IMG2_{3D}$ of the physical entity, which target image $IMG2_{3D}$ likewise is a 3D dataset, which typically contains a relatively large number of voxels, for example registered by an X-ray computer tomograph, a magnetic resonance equipment (e.g. using magnetic resonance imaging, MRI, nuclear magnetic resonance imaging, NMRI or magnetic resonance tomography, MRT) or an ultrasonic camera, however not necessarily the same equipment, or same type of equipment, that was used for generating the reference image $IMG1_{3D}$.

Additionally, the data processing unit 110 is configured to receive a first region of interest $ROI1_{3D}$ defining a first volume in the reference image $IMG1_{3D}$. The first region of interest $ROI1_{3D}$ represents a reference image element defining a particular region on the reference image $IMG1_{3D}$, for example corresponding to the delimitation boundaries of an individual organ, an organ system, a tissue, or some other body structure of a patient. Similar to the reference and target images $IMG1_{3D}$ and $IMG2_{3D}$ respectively the first region of interest $ROI1_{3D}$ is a 3D dataset that may be represented by voxels. However, the first region of interest $ROI1_{3D}$ is normally a dataset that has been manually defined by a human operator, e.g. a radiologist. Irrespective of the specific origin, the first region of interest $ROI1_{3D}$, the reference image $IMG1_{3D}$ and the target image $IMG2_{3D}$ are fed into the data processing unit 110 via one or more data interfaces.

The display unit 140 is configured to present graphic data GD reflecting the reference image $IMG1_{3D}$, the target image $IMG2_{3D}$ and the first region of interest $ROI1_{3D}$. Thus, a user, for example a radiologist, may visually inspect the image data, preferably interactively as seen from selected views, by entering commands via the at least one data input unit 131 and 132, which may be represented by any known input member for generating user commands to a computer, e.g. a keyboard 131 and/or a computer mouse 132.

The at least one data input unit 131 and 132 is configured to receive user commands c1 and c2 respectively. In response to the user commands c1 and/or c2, the data processing unit 110 is configured to define a first contour $C1_{2D}$ in a first plane through the target image $IMG2_{3D}$, preferably corresponding to a view of the target image $IMG2_{3D}$ presented on the display unit 140. Here, we presume that the user commands c1 and/or c2 are generated such that the first contour $C1_{2D}$ is aligned with at least a portion of a first border $IEB1$ of a target image element $IE_{3D}$ (e.g. the outline of a specific organ) in the target image $IMG2_{3D}$. In any case, the target image element $IE_{3D}$ corresponds to the reference image element in the reference image $IMG1_{3D}$.

The data processing unit 110 is further configured to determine a second region of interest $ROI2_{3D}$ defining a second volume in the target image $IMG2_{3D}$. According to the invention, the second region of interest $ROI2_{3D}$ is determined based on the first contour $C1_{2D}$, the target image $IMG2_{3D}$ and the first region of interest $ROI1_{3D}$.

Figures 3A, 3B:
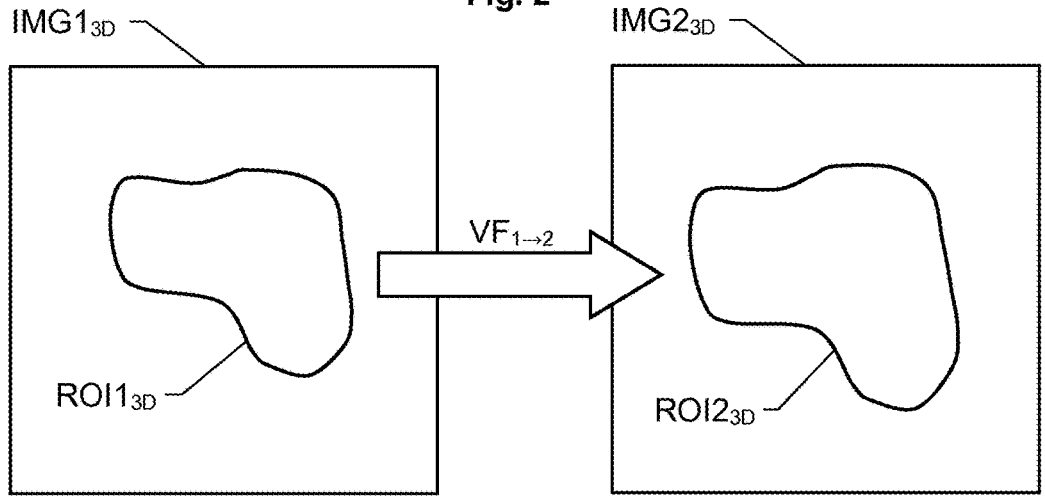
FIGS. 3a-b illustrate how a second volume of interest in a target image is obtained from a first region of interest in a reference image according to one embodiment of the invention.

FIGS. 3a and 3b illustrate how the second region of interest $ROI2_{3D}$ in a target image $IMG2_{3D}$ is obtained from the first region of interest $ROI1_{3D}$ in the reference image $ROI1_{3D}$.

According to one embodiment of the invention, the data processing unit 110 is further configured to compute a vector field $VF_{1\to2}$ describing a relationship between the first region of interest $ROI1_{3D}$ and the second region of interest $ROI2_{3D}$. The vector field $VF_{1\to2}$ has such properties that the second region of interest $ROI2_{3D}$ is obtainable by transforming the first region of interest $ROI1_{3D}$ via the vector field $VF_{1\to2}$. In other words, the second region of interest $ROI2_{3D}$ can be generated by for example multiplying the first region of interest $ROI1_{3D}$ with the vector field $VF_{1\to2}$.

Further preferably, the data processing unit 110 is configured to generate the second region of interest $ROI2_{3D}$ based on the first region of interest $ROI1_{3D}$ and the vector field $VF_{1\to2}$. Then, the data processing unit 110 is preferably configured to produce graphic data GP for presentation on the display unit 140 so that the graphic data GP reflect the second region of interest $ROI2_{3D}$ overlaid on the target image $IMG2_{3D}$. Consequently, a user may double check whether or not the vector field $VF_{1\to2}$ (and thus also the second region of interest $ROI2_{3D}$) is a sufficiently accurate definition of the organ, organ system, tissue, body structure etc. in the target image $IMG2_{3D}$. Should the vector field $VF_{1\to2}$ prove to be unacceptably imprecise, it is desirable if the user has a means to improve the data quality.

Figure 4:
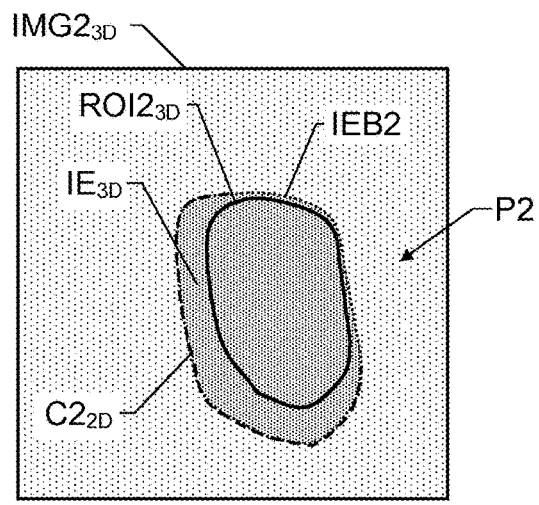
FIG. 4 illustrates a second example of a first contour in a second plane in the target image together with a border of the image element and another example of the first contour.
Figure 5:
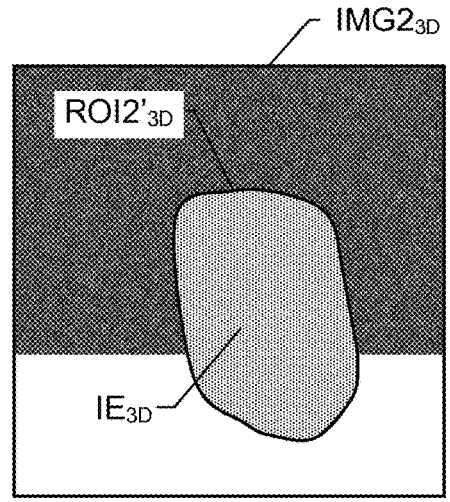
FIG. 5 illustrates a situation where the second example of the first contour in the second plane in the target image has been updated so that the region of interest matches the second volume.

To this aim, according to one embodiment of the invention, the data processing unit 110 is further configured to receive additional user commands c1 and/or c2 via the at least one data input unit 131 and/or 132 respectively. In response thereto, the data processing unit 110 is configured to define a second contour $C2_{2D}$ in a second plane P2 through the target image $IMG2_{3D}$ as illustrated in FIG. 4. Again, we assume that the user commands c1/c2 are generated such that the second contour $C2_{2D}$ is aligned with at least a portion of a second border $IEB2$ of the target image element $IE_{3D}$ in the target image $IMG2_{3D}$. Thereafter, the data processing unit 110 is configured to determine the second region of interest $ROI2_{3D}$ on the further basis of the second contour $C2_{2D}$. FIG. 5 illustrates an example of such an adjustment of an original second region of interest $ROI2_{3D}$ into an updated second region of interest $ROI2'_{3D}$.

When correcting/adjusting the second region of interest $ROI2_{3D}$ as described above, the data processing unit 110 may apply one or more of the strategies that will be described below with reference to FIGS. 6, 7a and 7b.

Figure 6:
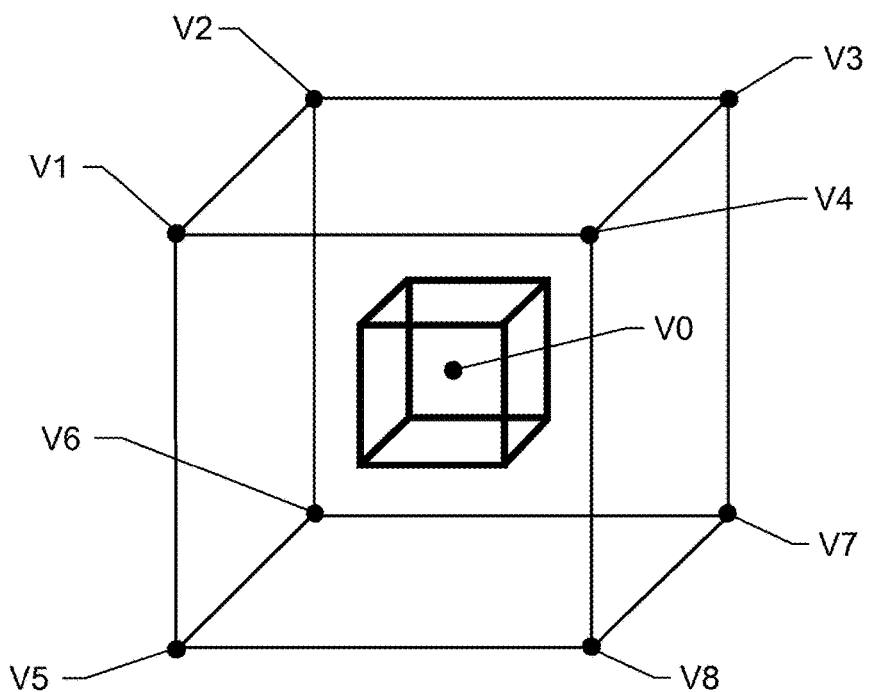
FIG. 6 illustrates how an intersection point with the first plane is calculated based on a convex combination of eight voxel centers according to one embodiment of the invention.

FIG. 6 illustrates how an intersection point V0 between the second region of interest $ROI2_{3D}$ and the first or second plane P1 or P2 respectively is calculated based on a convex combination of eight voxel centers V1, V2, V3, V4, V5, V6, V7 and V8 according to one embodiment of the invention. In FIG. 6, an inner box around the intersection point V0 here represents a volume within which the data value is one and the same, and in which the graphic data GP may be represented by a particular intensity and/or hue on the display unit 140.

As is common practice in computer graphics as well as in computer aided image processing of medical data, we presume that the second region of interest $ROI2_{3D}$ is represented by a triangular mesh. Preferably, the same is true also for the first region of interest $ROI1_{3D}$. Of course, regardless of how the above-mentioned first or second plane is oriented, many of the intersection points between the second region of interest $ROI2_{3D}$ and the first or second plane will occur at points different from one of the corners of a triangle in the triangular-mesh representation. In other words, the intersection line will miss numerous voxel centers of the vector field describing the second region of interest $ROI2_{3D}$. Therefore, the specific intersection points must be calculated.

According to one embodiment of the invention, this calculation is formulated as a non-linear optimizing problem including a term which penalizes deviation from the contour (i.e. $C1_{2D}$ or $C2_{2D}$). Here, a two dimensional distance transform is used as follows:

We assume that a contour $C1_{2D}$ or $C2_{2D}$ has been defined in a plane P1 or P2 for the second region of interest $ROI2_{3D}$, which, in turn, is represented by a triangular mesh, and the plane P1 or P2 intersects the second region of interest $ROI2_{3D}$. We define a set of edges of the second region of interest $ROI2_{3D}$, where intersection occurs as E.

For each edge in E, we compute the intersection point with the plane P1 or P2. As mentioned above, the resulting set of intersection points are typically not located at the voxel centers of the vector field. In order to express the intersection points in terms of the vector field, each intersection point V0 is computed by means of a convex combination of eight voxel centers V1, V2, V3, V4, V5, V6, V7 and V8 being adjacent to the intersection point V0 using mean value coordinates. We call such a point a virtual point $v_i$, where:

$$v_i = \sum_{i=1}^{8} w_i * p_i \text{ and } \sum_{i=1}^{8} w_i = 1$$

A distance transform $D(x)$ is computed for the contour $C1_{2D}$ or $C2_{2D}$ in the plane P1 or P2, such that $D(x)=0$ on the contour and $>0$ otherwise. $D(x)$ thereby approximates the Euclidean distance to the contour $C1_{2D}$ or $C2_{2D}$.

A non-linear term that penalizes deviation from the contour $C1_{2D}$ or $C2_{2D}$ may now be written:

$$f(x) = \sum_i D(v_i(x))^2.$$

Figures 7A, 7B:
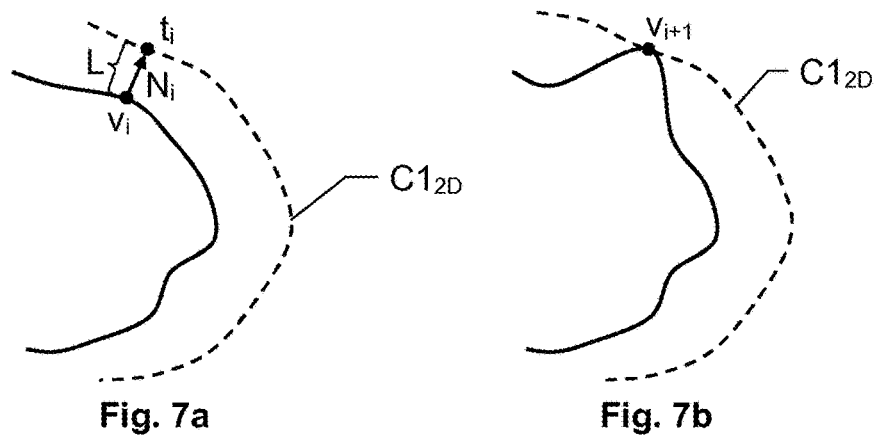
FIGS. 7a-b illustrate how the second region of interest is iteratively adapted to a user-defined contour according to one embodiment of the invention.

FIGS. 7a and 7b illustrate an alternative strategy according to which the intersection between the first or second plane P1 or P2 and the second region of interest $ROI2_{3D}$ may be computed, namely via an iterative process running outer iterations as well as inner iterations relative to the contour $C1_{2D}$ or $C2_{2D}$.

Also in this case, the second region of interest $ROI2_{3D}$ is represented by a triangular mesh. Here the non-linear term of the objective function due to the contour $C1_{2D}$ or $C2_{2D}$ is unchanged during a major iteration, and updated between major iterations. Using the terminology from the above-described strategy, the difference is that for each intersection point $v_i$ between the contour $C1_{2D}$ or $C2_{2D}$ and the plane P1 or P2 a normal $N_i$ is computed by interpolation of the vertex normal at the edge corners.

The normal $N_i$ is then projected onto the plane P1 or P2 and a search along the projected normal in an interval of length L is performed. If an intersection point $t_i$ with the contour $C1_{2D}$ or $C2_{2D}$ is found this is added to the non-linear function:

$$f(x) = \sum_i w_i * \|v_i - t_i\|^2.$$

Here, the weight $w_i$ may either be 1, or the weight $w_i$ may depend on an intersection angle with the contour $C1_{2D}$ or $C2_{2D}$ in such a way that an almost orthogonal intersection results in a relatively high weight and an almost parallel intersection results in a relatively low weight.

FIGS. 7a and 7b show an example of a situation where an intersection point $t_i$ is found within the interval of length L in an iteration i; and therefore, a corresponding intersection point $v_{i+1}$ is included in the contour $C1_{2D}$ in a subsequent iteration of the procedure.

A stop criterion for the iteration is defined, which stop criterion preferably is chosen from heuristics. For example, the stop criterion may be considered to be fulfilled if the number of new intersection points $t_i$ decreases (i.e. becomes lower in a subsequent iteration i+1), and/or if the number of intersection points $t_i$ begin to remain approximately the same from one iteration to another.

The data processing unit 110 preferably contains, or is in communicative connection with a memory unit 115 storing a computer program product SW, which contains software for making at least one processor in the data processing unit 110 execute the above-described actions when the computer program product SW is run on the at least one processor.

Figure 8:
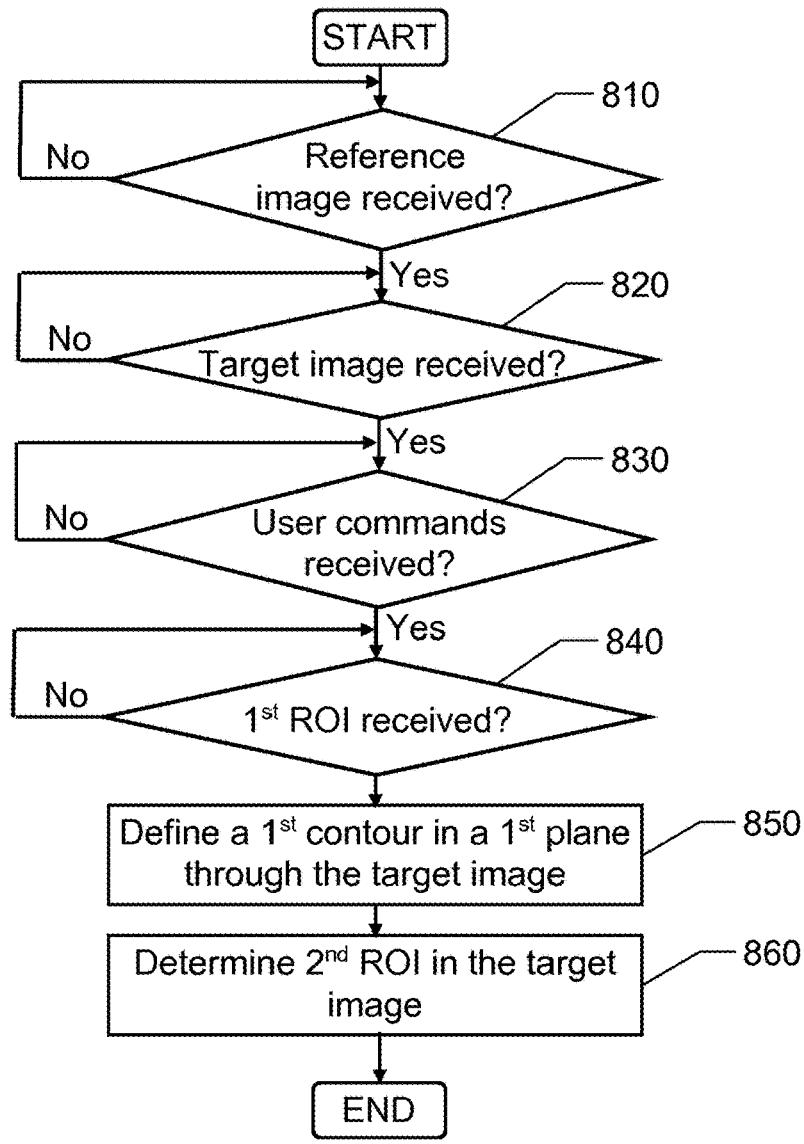
FIG. 8 illustrates, by means of a flow diagram, the general method according to the invention for handling images.

In order to sum up, and with reference to the flow diagram in FIG. 8, we will now describe the general method executed in the data processing unit 110 according to the invention when processing image data and user commands.

A first step 810 checks if a reference image $IMG1_{3D}$ of a deformable physical entity has been received; and if so, a step 820 follows. Otherwise, the procedure loops back and stays in step 810. The reference image $IMG1_{3D}$ is a 3D dataset, for example represented by a relatively large number of voxels registered by a computer tomograph or similar equipment.

Step 820 checks if a target image $IMG2_{3D}$ of the deformable physical entity has been received, i.e. another image of the same object/subject as represented by the reference image $IMG1_{3D}$. If, in step 820 a target image $IMG2_{3D}$ is received, a step 830 follows. Otherwise the procedure loops back and stays in step 820. The target image $IMG2_{3D}$ is a 3D dataset, for example represented by a relatively large number of voxels registered by a computer tomograph or similar equipment.

Step 830 checks if user commands have been received via one or more data input units (e.g. a computer mouse and/or a keyboard), which user commands are presumed to be entered aiming at defining a first contour $C1_{2D}$ in a first plane through the target image $IMG2_{3D}$. If such user commands are received, a step 840 follows. Otherwise the procedure loops back and stays in step 830.

Step 840 checks if a first region of interest $ROI1_{3D}$ has been received, and if so a step 850 follows. Otherwise, the procedure loops back and stays in step 840. The first region of interest $ROI1_{3D}$ defines a first volume in the reference image $IMG1_{3D}$, which first volume represents a reference image element, for instance a particular organ/structure in a patient. The first region of interest $ROI1_{3D}$ is a 3D dataset, preferably represented by voxels that may have been manually defined by an operator.

It should be noted that the exact order of steps 810 to 840 is not critical, and may be varies according to the invention provided that the user commands are received after the target image $IMG2_{3D}$. Namely, the user commands are entered based on the target image $IMG2_{3D}$.

In step 850, in response to the user commands, a first contour $C1_{2D}$ is defined in a first plane through the target image $IMG2_{3D}$. The first contour $C1_{2D}$ is presumed to be aligned with at least a portion of a border IEB1 or IEB2 of a target image element $IE_{3D}$ in the target image $IMG2_{3D}$. The target image element $IE_{3D}$ corresponds to the reference image element in the reference image $IMG1_{3D}$.

Subsequently, in a step 860, a second region of interest $ROI2_{3D}$ is determined, which defines a second volume in the target image $IMG2_{3D}$. The second region of interest $ROI2_{3D}$ is determined based on the first contour $C1_{2D}$, the target image $IMG2_{3D}$ and the first region of interest $ROI1_{3D}$. Preferably, in connection with determining the second region of interest $ROI2_{3D}$, graphic data GD are presented on a display unit, which the graphic data GD reflect the target image $IMG2_{3D}$ and the second region of interest $ROI2_{3D}$.

Thereafter, the procedure ends. However, according to preferred embodiments of the invention, the user is provided with an input interface via which he/she may enter additional commands for adjusting any mismatching between the second region of interest $ROI2_{3D}$ and the deformable physical entity in the target image $IMG2_{3D}$, for example by defining a second contour $C2_{2D}$ in a second plane P2 through the target image $IMG2_{3D}$.

All of the process steps, as well as any sub-sequence of steps, described with reference to FIG. 8 above may be controlled by means of a programmed computer apparatus. Moreover, although the embodiments of the invention described above with reference to the drawings comprise a computer apparatus and processes performed in a computer apparatus, the invention thus also extends to computer programs, particularly computer programs on or in a carrier, adapted for putting the invention into practice. The program may be in the form of source code, object code, a code intermediate to source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. An image handling system, comprising:
   a data processing unit configured to receive: a reference image of a deformable physical entity, a target image of said physical entity, and a first region of interest defining a first volume in the reference image, which first volume represents a reference image element, the reference image, the target image, and the first region of interest containing a respective three-dimensional dataset;
   at least one data input unit configured to receive user commands; and
   a display unit configured to present graphic data reflecting the reference image, the target image, and the first region of interest,
   wherein the data processing unit is further configured to:
     define, in response to the user commands, a first contour in a first plane through the target image, the first contour being aligned with at least a portion of a first border of a target image element in the target image, the target image element corresponding to the reference image element in the reference image; and
     determine a second region of interest defining a second volume in the target image, the second region of interest being determined based on the first contour, the target image, and the first region of interest.

2. The image handling system according to claim 1, wherein the data processing unit is further configured to compute a vector field describing a relationship between the first region of interest and the second region of interest, the second region of interest being obtainable by transforming the first region of interest via the vector field.

3. The image handling system according to claim 1, wherein the data processing unit is further configured to:
   generate the second region of interest based on the first region of interest and the vector field; and
   produce graphic data for presentation on the display unit, which graphic data reflect the second region of interest overlaid on the target image.

4. The image handling system according to claim 1, wherein the data processing unit is further configured to:
   receive additional user commands, and in response thereto, define a second contour in a second plane through the target image, the second contour being aligned with at least a portion of a second border of the target image element in the target image; and
   determine the second region of interest on the further basis of the second contour.

5. The image handling system according to claim 1, wherein the data processing unit is configured to determine the second region of interest based on a non-linear optimization algorithm applied to the first contour and an intersection between the second region of interest and the first plane, the non-linear optimization algorithm being configured to penalize deviation of the second region of interest from the first contour.

6. The image handling system according to claim 5, wherein the second region of interest is represented by a triangular mesh, and the non-linear optimization algorithm involves:
   computing a set of intersection points between the second region of interest and the first plane, each intersection point in the set of intersection points being computed by means of a convex combination of eight voxel centers being adjacent to the intersection point using mean value coordinates; and
   applying a two-dimensional distance transform on a Euclidean distance between each computed intersection point and the first contour.

7. The image handling system according to claim 5, wherein the second region of interest is represented by a triangular mesh, and the non-linear optimization algorithm involves:
   computing a set of intersection points between the second region of interest and the first plane, and for each intersection point in the set of intersection points:

determining a normal projection from the second region of interest towards the first plane, the normal projection extending in an interval of predetermined length, and if within the predetermined length the normal intersects with the first contour at a juncture, the juncture is included as a tentative delimitation point of an updated second region of interest; and repeating the determining step based on the updated second region of interest until a stop criterion is fulfilled.

8. A method of handling images, the method comprising:

receiving a reference image of a deformable physical entity;

receiving a target image of said physical entity;

receiving a first region of interest defining a first volume in the reference image, which first volume represents a reference image element, the reference image, the target image, and the first region of interest containing a respective three-dimensional dataset;

receiving user commands via at least one data input unit;

presenting graphic data on a display unit, the graphic data reflecting the reference image, the target image, and the first region of interest;

defining, in response to the user commands, a first contour in a first plane through the target image, the first contour being aligned with at least a portion of a first border of a target image element in the target image, the target image element corresponding to the reference image element in the reference image; and determining a second region of interest defining a second volume in the target image, the second region of interest being determined based on the first contour, the target image, and the first region of interest.

9. The method according to claim 8, further comprising computing a vector field describing a relationship between the first region of interest and the second region of interest, the second region of interest being obtainable by transforming the first region of interest via the vector field.

10. The method according to claim 8, further comprising:

generating the second region of interest based on the first region of interest and the vector field; and producing graphic data for presentation on the display unit, which graphic data reflect the second region of interest overlaid on the target image.

11. The method according to claim 8, further comprising:

receiving additional user commands, and in response thereto, defining a second contour in a second plane through the target image, the second contour being aligned with at least a portion of a second border of the target image element in the target image; and determining the second region of interest on the further basis of the second contour.

12. The method according to claim 8, comprising determining the second region of interest based on a non-linear optimization algorithm applied to the first contour and an intersection between the second region of interest and the first plane, the non-linear optimization algorithm being configured to penalize deviation of the second region of interest from the first contour.

13. The method according to claim 12, wherein the second region of interest is represented by a triangular mesh, and the method involves:

computing a set of intersection points between the second region of interest and the first plane, each intersection point in the set of intersection points being computed by means of a convex combination of eight voxel centers being adjacent to the intersection point using mean value coordinates; and applying a two-dimensional distance transform on a Euclidean distance between each computed intersection point and the first contour.

14. The method according to claim 12, wherein the second region of interest is represented by a triangular mesh, and the method involves:

computing a set of intersection points between the second region of interest and the first plane, and for each intersection point in the set of intersection points:

determining a normal projection from the second region of interest towards the first plane, the normal projection extending in an interval of predetermined length, and if within the predetermined length the normal intersects with the first contour at a juncture, the juncture is included as a tentative delimitation point of an updated second region of interest; and repeating the determining step based on the updated second region of interest until a stop criterion is fulfilled.

15. A non-transitory processor-readable medium comprising instructions which, when executed by at least one processor, cause the at least one processor to perform the method according to claim 8.

* * * * *